US010795157B2

(12) United States Patent
Honma et al.

(10) Patent No.: US 10,795,157 B2
(45) Date of Patent: Oct. 6, 2020

(54) DISPLAY DEVICE FOR VEHICLE

(71) Applicant: NIPPON SEIKI CO., LTD., Niigata (JP)

(72) Inventors: Kazuki Honma, Niigata (JP); Yuki Masuya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 263 days.

(21) Appl. No.: 16/087,986

(22) PCT Filed: Mar. 9, 2017

(86) PCT No.: PCT/JP2017/009389
§ 371 (c)(1),
(2) Date: Sep. 24, 2018

(87) PCT Pub. No.: WO2017/169609
PCT Pub. Date: Oct. 5, 2017

(65) Prior Publication Data
US 2019/0049729 A1    Feb. 14, 2019

(30) Foreign Application Priority Data

Mar. 28, 2016  (JP) ................................. 2016-063914

(51) Int. Cl.
*G02B 27/01*    (2006.01)
*B60K 35/00*    (2006.01)
(Continued)

(52) U.S. Cl.
CPC .......... *G02B 27/0149* (2013.01); *B60K 35/00* (2013.01); *G02B 26/0816* (2013.01);
(Continued)

(58) Field of Classification Search
CPC ............ G02B 27/0149; G02B 26/0816; G02B 27/01; G02B 27/0101; G02B 27/0179; B60K 35/00; H02P 8/22
(Continued)

(56) References Cited

U.S. PATENT DOCUMENTS 5,204,666 A *  4/1993  Aoki ...................... B60K 37/02
345/9
2006/0291066 A1  12/2006  Shiobara et al.
(Continued)

FOREIGN PATENT DOCUMENTS

JP    2000-137189 A    5/2000
JP    2003-312314 A    11/2003
(Continued)

OTHER PUBLICATIONS

International Search Report issued in corresponding International Patent Application No. PCT/JP2017/009389, dated Jun. 6, 2017, with English Translation.

*Primary Examiner* — James R Greece
(74) *Attorney, Agent, or Firm* — McDermott Will & Emery LLP

(57) ABSTRACT

Provided is a display device for a vehicle that can rapidly execute preparation completion for display of vehicle information. The display device for a vehicle is provided with a processing unit, a display, and a rotational drive unit that can rotate a reflector on a prescribed axis. The processing unit includes an estimating unit that estimates planned start of the vehicle by a crew, and when the vehicle is planned to be started, the angle of rotation of the rotational drive unit moves from an initial angle corresponding to an initial
(Continued)

position (position of point of origin) of the reflector to a first intermediate angle (first stopping position) between the initial angle and a final angle corresponding to the normal operating position of the reflector. After the vehicle has been actually started, the angle of rotation of the rotational drive unit moves to a final angle from the first intermediate angle.

6 Claims, 6 Drawing Sheets

(51) Int. Cl.
  *G02B 26/08* (2006.01)
  *H02P 8/22* (2006.01)
(52) U.S. Cl.
  CPC ......... *G02B 27/01* (2013.01); *G02B 27/0101* (2013.01); *G02B 27/0179* (2013.01); *H02P 8/22* (2013.01); *B60K 2370/1529* (2019.05); *B60K 2370/23* (2019.05); *B60K 2370/66* (2019.05); *G02B 2027/0161* (2013.01); *G02B 2027/0181* (2013.01); *G02B 2027/0183* (2013.01)

(58) Field of Classification Search
  USPC .......................................................... 359/630
  See application file for complete search history.

(56) References Cited

U.S. PATENT DOCUMENTS

| | | | |
|---|---|---|---|
| 2010/0164702 A1* | 7/2010 | Sasaki | G01B 21/22 340/438 |
| 2015/0226964 A1 | 8/2015 | Sasaki et al. | |
| 2016/0202472 A1 | 7/2016 | Sasaki | |
| 2016/0209663 A1 | 7/2016 | Hirokawa et al. | |
| 2017/0038587 A1 | 2/2017 | Ishibashi et al. | |

FOREIGN PATENT DOCUMENTS

| | | |
|---|---|---|
| JP | 2004-090713 A | 3/2004 |
| JP | 2009-126494 A | 6/2009 |
| JP | 2013-173465 A | 9/2013 |
| JP | 2014-052531 A | 3/2014 |
| JP | 2015-052656 A | 3/2015 |
| JP | 2015-060180 A | 3/2015 |
| JP | 2015-208195 A | 11/2015 |
| JP | 2016-030503 A | 3/2016 |

* cited by examiner

[Fig.1]
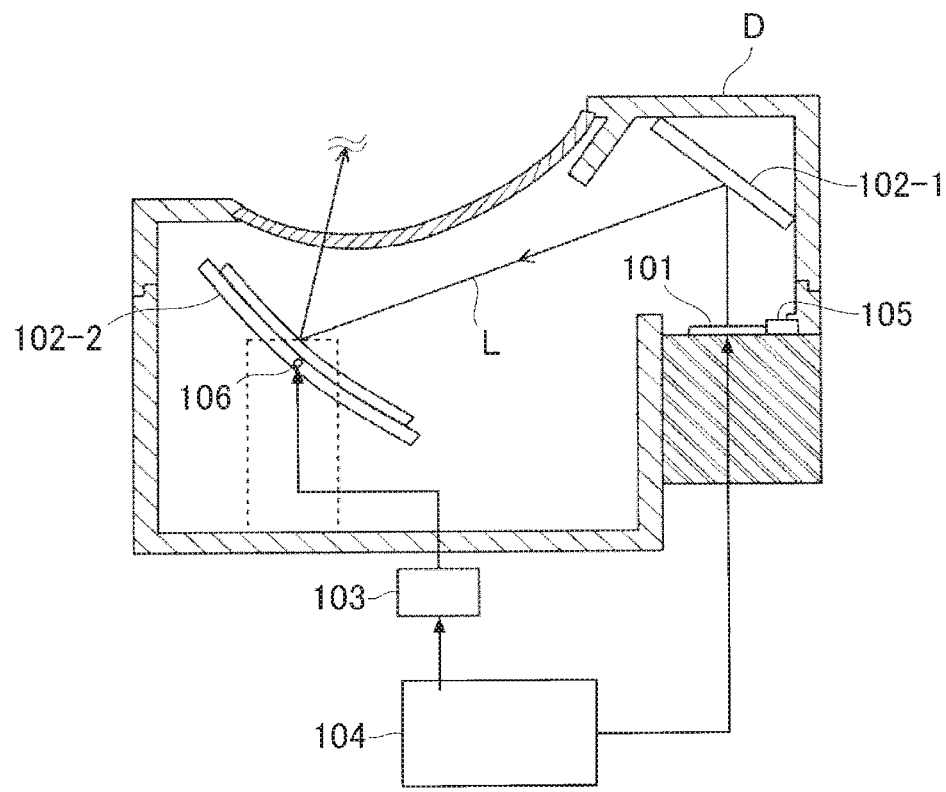
[Fig.2]
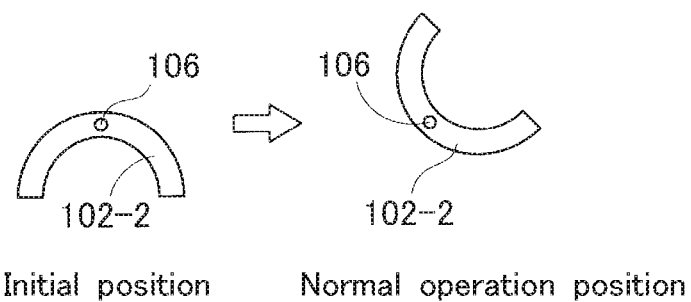
Initial position     Normal operation position

[Fig.3]
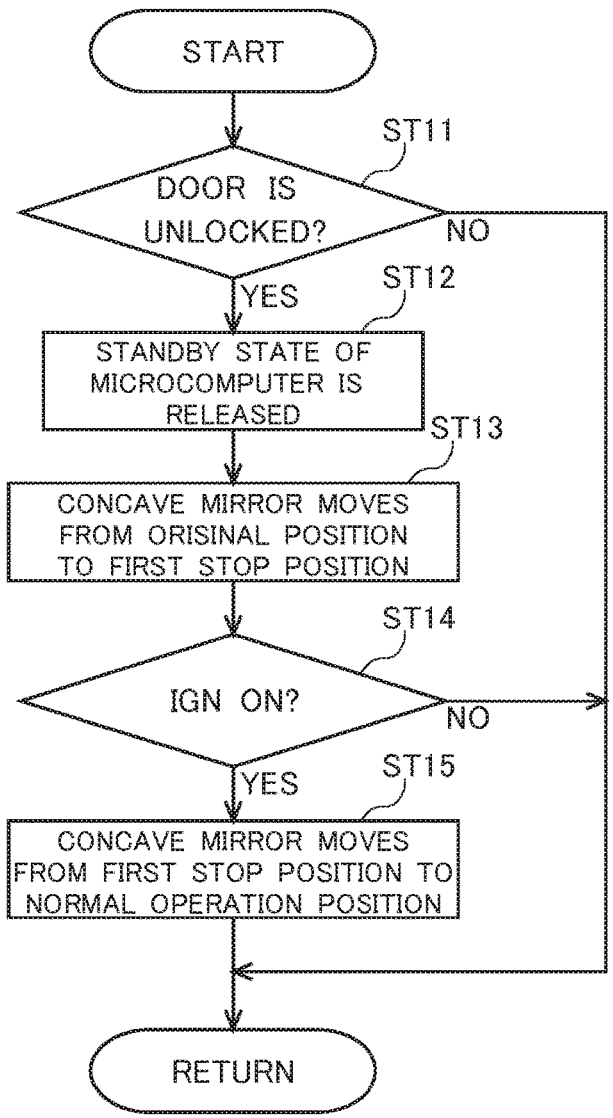
[Fig.4]
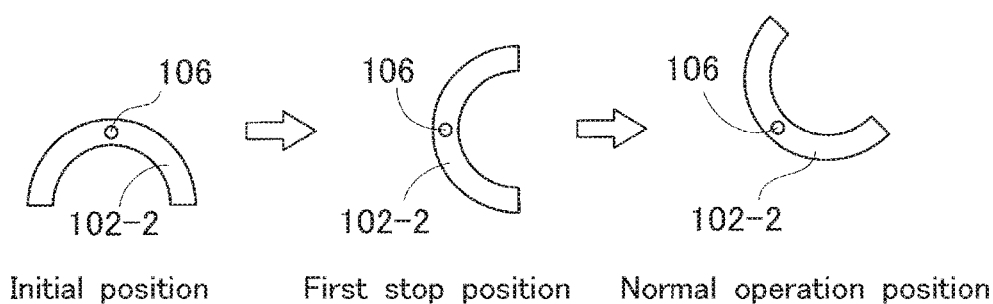
Initial position     First stop position     Normal operation position

[Fig.5]
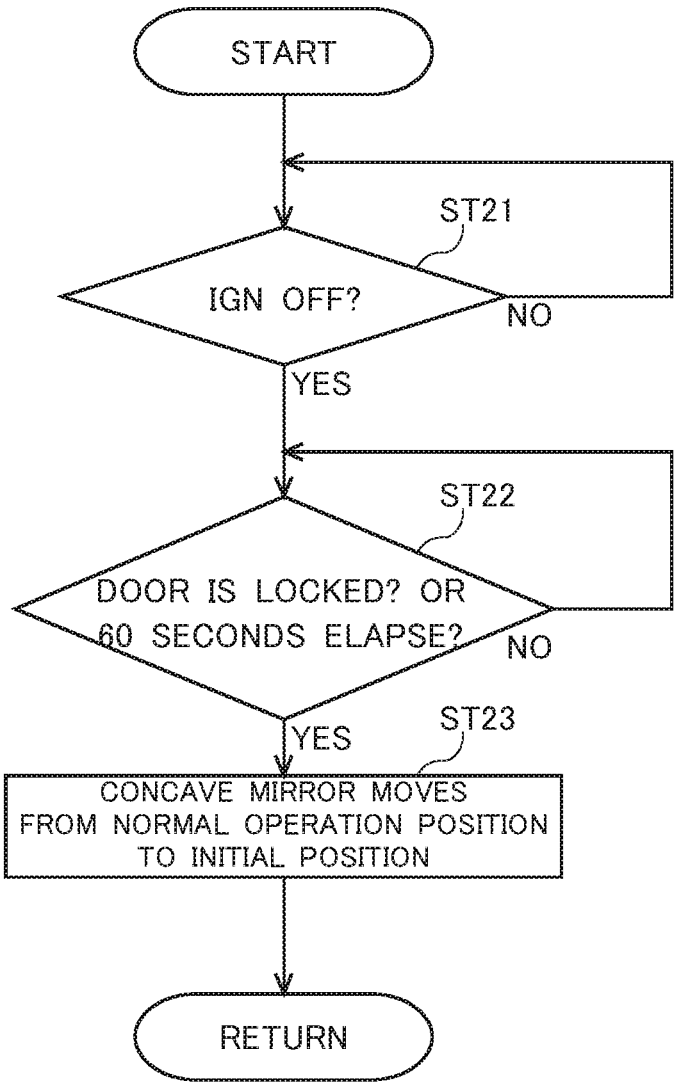
[Fig.6]
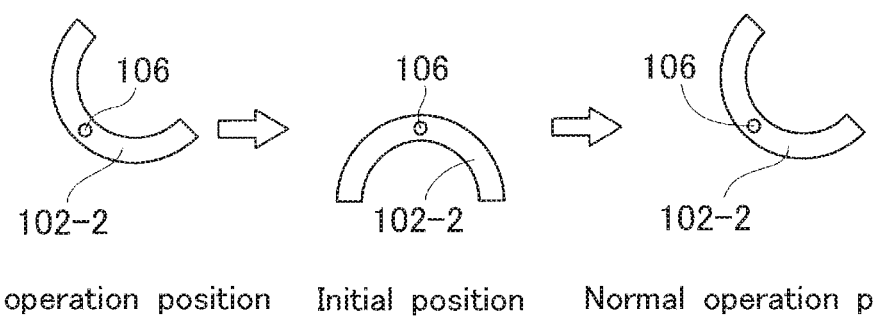
Normal operation position     Initial position     Normal operation position

[Fig.7]
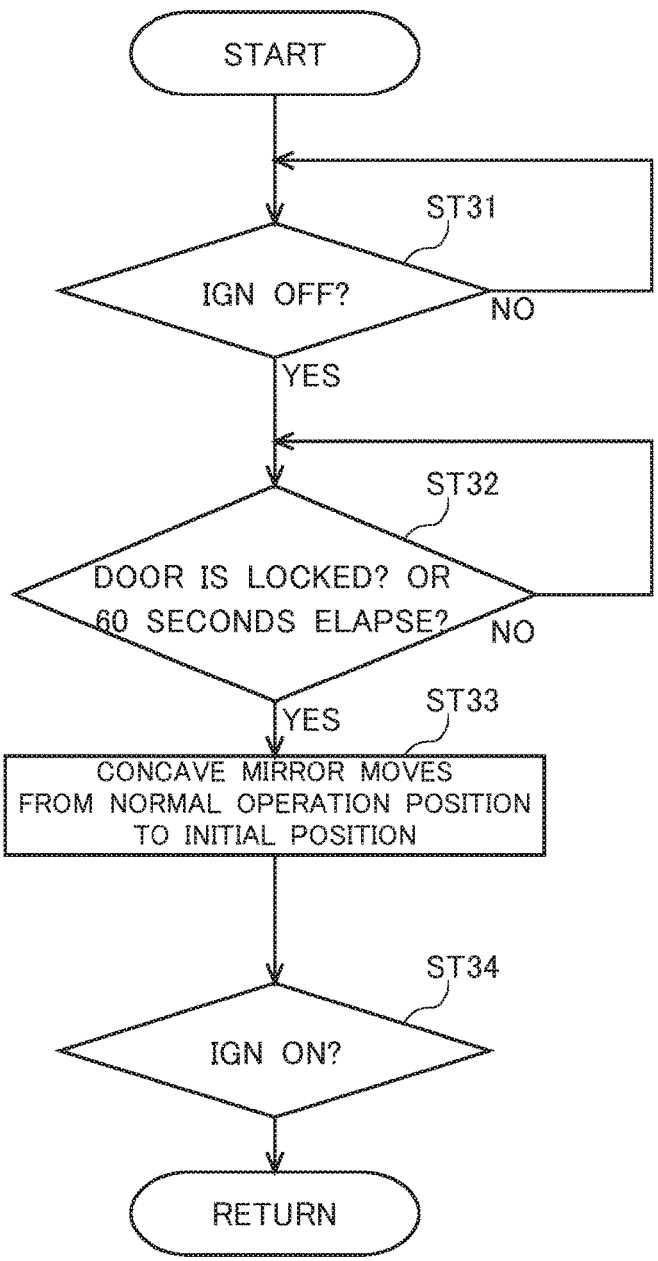
[Fig.8]
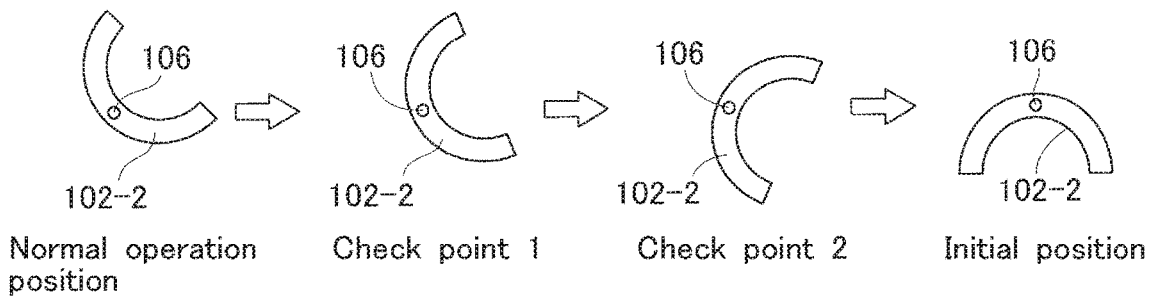
Normal operation position    Check point 1    Check point 2    Initial position

[Fig.9]
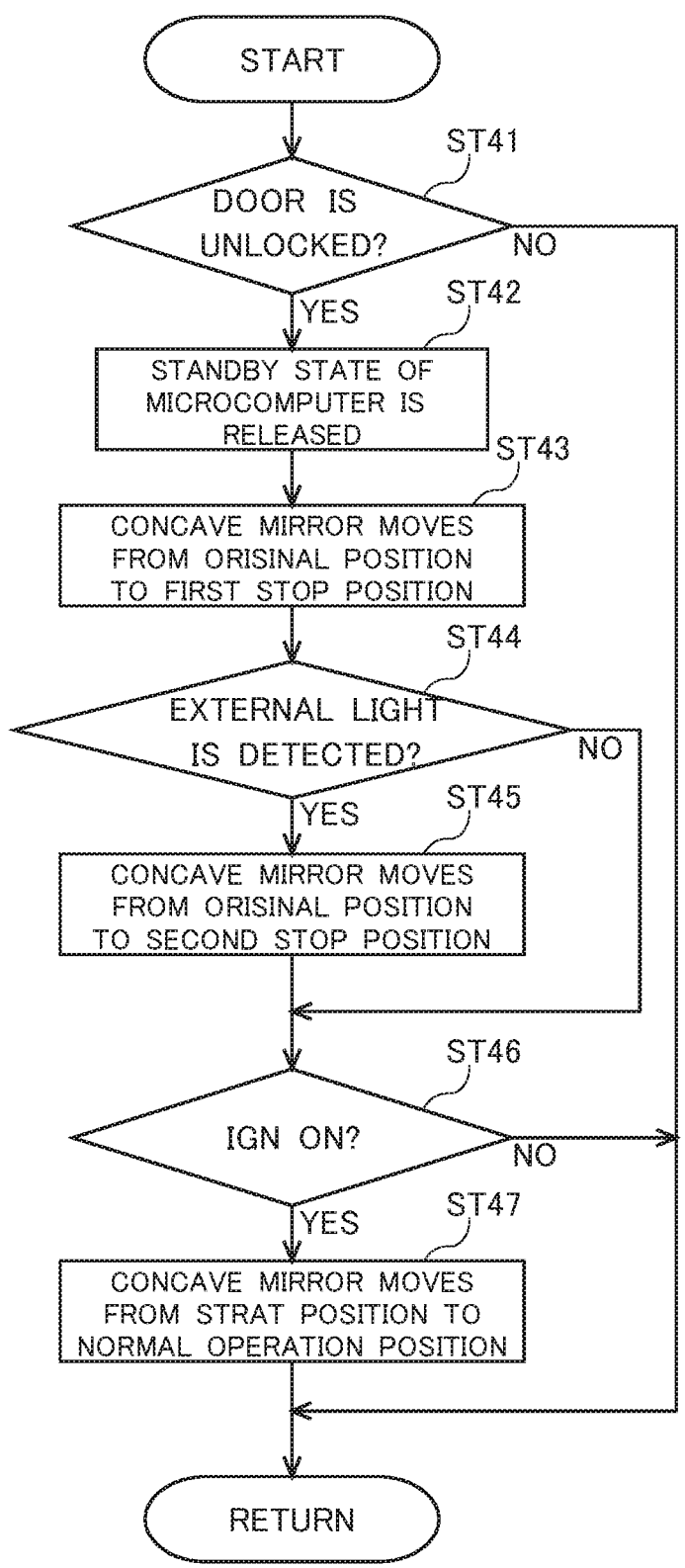

[Fig.10]
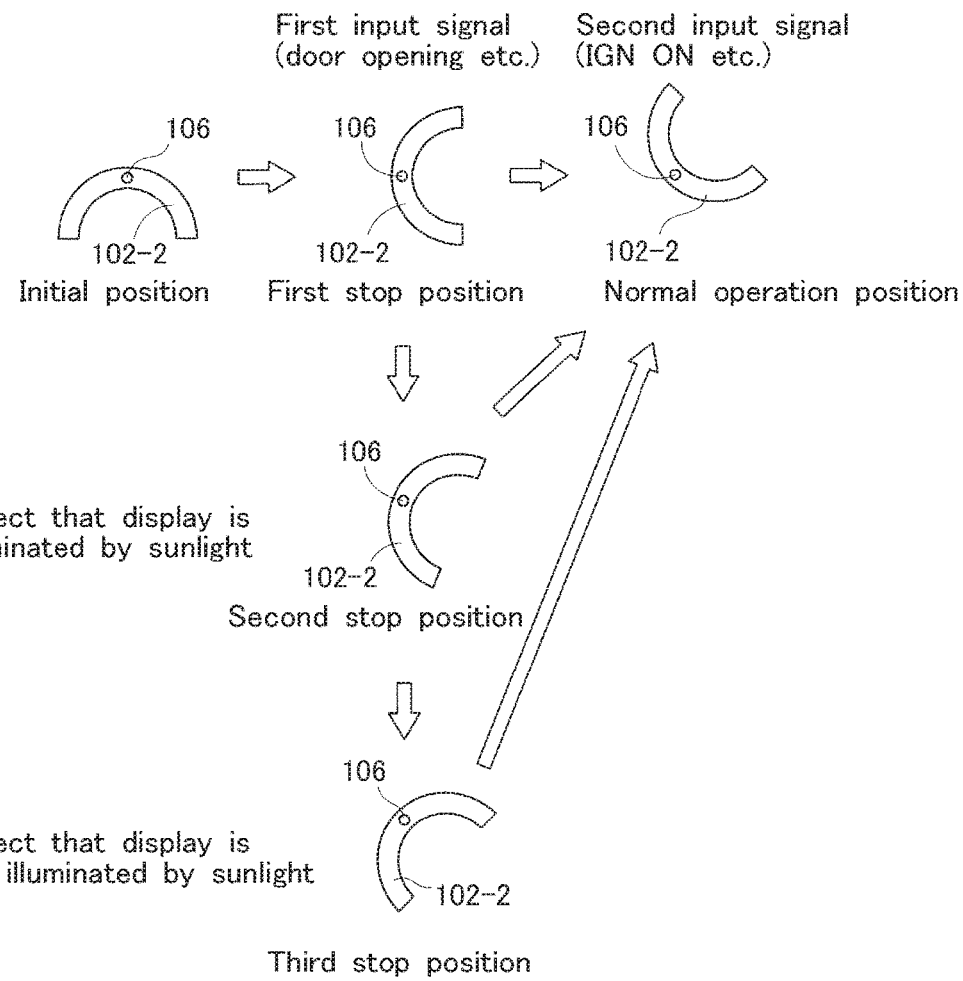
[Fig.11]
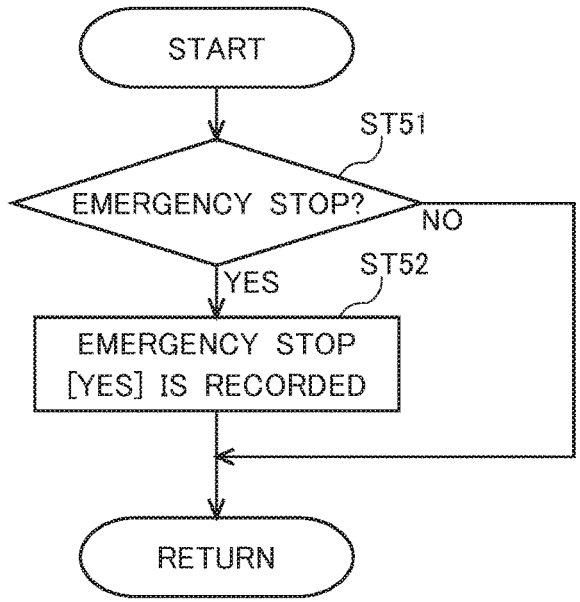

DISPLAY DEVICE FOR VEHICLE

CROSS REFERENCE

This application is the U.S. National Phase under 35 U.S.C. § 371 of International Application No. PCT/JP2017/009389, filed on Mar. 9, 2017, which claims the benefit of Japanese Application No. 2016-063914, filed on Mar. 28, 2016, the entire contents of each are hereby incorporated by reference.

TECHNICAL FIELD

The present invention relates to a display device (a vehicle display device) used or provided in a vehicle. More particularly, the present invention relates to a vehicle display device capable of promptly completing preparation of display when displaying, for example, a virtual image indicating vehicle speed information, such as measuring instrument information, to a vehicle occupant.

BACKGROUND ART

For example, Patent Literature 1 discloses a display unit 2 as a vehicle display device. The display unit 2 is capable of generating light (display light L) for projecting an image representing information related to a vehicle (host vehicle) (e.g., vehicle speed information or navigation information) on a windshield (front windshield) of the vehicle.

Projection or display of the display information as, for example, vehicle information on the windshield is generally called "head-up display (HUD) by those skilled in the art.

The display unit 2 of Patent Literature 1 causes light emission of the display light L to start and then drives a first stepping motor 5c. Therefore, a concave mirror 5a is rotated about a rotational shaft R1 to a first set position. In FIG. 2 of Patent Literature 1, in the first installation position, a tilt angle θ made by a bottom surface of a hold member 5b of a concave mirror 5a and a virtual horizontal line F is set to a reference angle (e.g., 45 degrees to 40 degrees). That is, preparation of display of vehicle information by the display light L of the display unit 2 is completed when the concave mirror 5a is set in the first installation position.

In the display unit 2 of Patent Literature 1, the concave mirror 5a is rotatable about another rotational shaft R2 upon driving a second stepping motor 41a and, thereby, tilt or rotation of a virtual image (an erect image) recognized by a vehicle occupant P may be adjusted or calibrated.

CITATION LIST

Patent Literature

Patent Literature 1: Japanese Unexamined Patent Application Publication No. 2009-126494

SUMMARY OF THE INVENTION

Problems to be Solved by the Invention

Typically, display of vehicle information by a vehicle display device (light emission of display light) is started when a vehicle or a driving part of a vehicle (specifically, an engine, a traction motor, a hybrid engine, and the like) is started (specifically, an ignition key or a start button is turned on). Therefore, rotation of the concave mirror 5a of Patent Literature 1 is also started when a vehicle is started. That is, a certain time is needed to complete preparation of display of the vehicle information, i.e., after the vehicle started and before the vehicle occupant recognizes the vehicle information.

An object of the present invention is to provide a vehicle display device capable of promptly completing preparation of display of vehicle information. Other objects of the present invention will become apparent to those skilled in the art from the following exemplary embodiments, best modes, and attached claims.

Means for Solving the Problems

Embodiments in accordance with the present invention will be described for easy understanding of the summary of the present invention.

In the first embodiment, a vehicle display device, includes a display part provided with a display that generates display light of an image representing vehicle information and a reflector that reflects the display light, and capable of displaying the display light as a virtual image; a rotation-driver capable of driving the reflector to rotate about a predetermined shaft; an estimator that estimates that a vehicle is to be started by a vehicle occupant; a determiner that determines whether driving of the vehicle has been started actually; and a controller that controls a rotational angle of the rotation-driver, wherein the controller controls the rotation-driver so that, when driving of the vehicle is to be started, the rotational angle is moved from an initial angle corresponding to an initial position of the reflector to a first intermediate angle between the initial angle and a final angle corresponding to a normal operation position of the reflector, and the controller controls the rotation-driver so that, after driving of the vehicle is started actually, the rotational angle is moved from the first intermediate angle to the final angle.

In the first embodiment, it is determined whether driving of a vehicle has been started actually and, it is estimated that the vehicle is to be started by a vehicle occupant. Therefore, before driving of the vehicle is started actually, when the start of the driving of the vehicle is estimated, the rotational angle of the rotation-driver is capable of standing by at the first intermediate angle (the first stop position). When driving of the vehicle is started actually, the rotational angle of the rotation-driver is moved not from the initial angle but from the first intermediate angle. Therefore, the time before the rotational angle of the rotation-driver arrives at the final angle is reduced. That is, preparation of display of vehicle information is completed promptly.

In a second embodiment dependent on the first embodiment, when the rotational angle is stopped at the first intermediate angle, the determiner may determine that the display is in a high temperature state higher than a predetermined temperature or determines whether the display seems to become a high temperature state, and when the display is in a high temperature state or seems to become a high temperature state, the controller may control the rotation-driver so that the rotational angle is moved from the first intermediate angle to a second intermediate angle between the initial angle and the first intermediate angle or between the final angle and the first intermediate angle.

In the second embodiment, when the rotational angle of the rotation-driver is stopped at the first intermediate angle, that is, when preparation for the display of the vehicle information is started, whether or not the display is in a high temperature state will be considered. When the display is in a high temperature state or seems to become a high temperature state, the rotational angle of the rotation-driver is moved to another intermediate angle (the second intermediate angle). The rotational angle of the rotation-driver is moved from the first intermediate angle, that is, the rotational angle of the rotation-driver is not stopped at the first intermediate angle. Therefore, it is avoided or prevented that the display becomes a high temperature state.

In a third embodiment dependent on the first or the second embodiment, in the vehicle display device, the determiner may determine whether power supply to the display has been shut down temporarily, and when the power supply is shut down temporarily, the controller may record occurrence of the temporary shutdown of the power supply.

In the third embodiment, temporary shutdown of the power supply to the display is recorded. That is, in the third embodiment, in consideration of temporary shutdown of the power supply, restoration or recovery of subsequent power supply can be dealt with properly.

In a fourth embodiment dependent on the third embodiment, when a processor including the determiner and the controller starts, the determiner may determine whether occurrence of temporary shutdown of the power supply has been recorded, and the controller may control the rotation-driver so that, when occurrence of temporary shutdown of the power supply is recorded, a current rotational angle of the rotation-driver is kept or the current rotational angle is moved to the final angle.

In the fourth embodiment, when the processor starts upon restoration or recovery of power supply, the determiner is capable of discovering a record representing occurrence of temporary shutdown of power supply. When temporary shutdown of power supply occurs, it is estimated that the rotational angle of the rotation-driver has been the final angle or that the rotational angle of the rotation-driver is located near the final angle. Therefore, the controller is capable of keeping the rotational angle of the rotation-driver at the final angle, or returning to the final angle immediately. In the fourth embodiment, when the power supply is restored or recovered, display of the vehicle information is able to be restored or recovered immediately.

In a fifth embodiment dependent on any one of the first to the fourth embodiments, the determiner may determine whether driving of the vehicle has been stopped, and the controller may control the rotation-driver so that, when driving of the vehicle is stopped, the rotational angle is kept at the final angle for a predetermined period.

In the fifth embodiment, when driving of the vehicle is stopped, the rotational angle of the rotation-driver is kept at the final angle for a predetermined period. That is, in the fifth embodiment, when driving of the vehicle is resumed in a predetermined period, display of the vehicle information is able to be restored or recovered immediately.

In the sixth embodiment dependent on any one of the first to the fifth embodiments, the controller may control the rotational angle so that after driving of the vehicle is stopped, the rotational angle is moved from the final angle to the initial angle, the determiner may determine that whether driving of the vehicle has been resumed during return of the rotational angle to the initial angle, and the controller may control the rotation-driver so that, when driving of the vehicle is resumed, the rotational angle returns to the final angle.

In the sixth embodiment, after driving of the vehicle is stopped, it is determined whether driving of the vehicle has been resumed during the return of the rotational angle of the rotation-driver to the initial angle. When driving of the vehicle is resumed, the rotational angle of the rotation-driver is capable of being returned to the final angle immediately.

It should be readily appreciated by those skilled in the art that the exemplified embodiments according to the present invention may be further changed without departing from the spirit of the present invention.

BRIEF DESCRIPTION OF THE DRAWINGS

FIG. 1 illustrates an example of a general configuration of a vehicle display device (vehicle information projection system) according to the present invention.

FIG. 2 illustrates an example of an operation of a rotational angle of a rotation-driver when driving of a vehicle is started actually (an explanatory view).

FIG. 3 is a flowchart illustrating an example of a rotational angle of the rotation-driver when driving of a vehicle is started actually.

FIG. 4 illustrates an example of an operation at a first stop position in flowchart of FIG. 3 (an explanatory view).

FIG. 5 is a flowchart illustrating an example of control of a rotational angle of a rotation-driver when driving of a vehicle is stopped.

FIG. 6 illustrates an example of an operation of a rotation-driver in an initial position in the flowchart of FIG. 5 (explanatory view).

FIG. 7 is a flowchart illustrating another example of control of a rotational angle of a rotation-driver when driving of a vehicle is stopped.

FIG. 8 illustrates an example of an operation of a rotation-driver in an initial position in the flowchart of FIG. 7 (explanatory view).

FIG. 9 is a flowchart illustrating an example of control when a display is in a high temperature state.

FIG. 10 illustrates an example of an operation of a rotation-driver in a second stop position in the flowchart of FIG. 9 (explanatory view).

FIG. 11 is a flowchart illustrating an example of control when power supply is temporarily shut down.

MODE FOR CARRYING OUT THE INVENTION

Preferred embodiments below will be provided for easy understanding of the present invention. Therefore, those skilled in the art should note that the present invention is not to be unduly limited by the embodiments described below.

FIG. 1 illustrates an example of a general configuration of a vehicle display device according to the present invention. As illustrated in FIG. 1, the vehicle display device includes, for example, a vehicle information projection system. The vehicle information projection system includes, for example, a display mechanism. The display mechanism is capable of projecting vehicle information in a display range set, for example, in a part of a windshield (not illustrated) of a vehicle and displaying, in the display range, vehicle information so that a virtual image (not illustrated) of display information (specifically, vehicle information) overlaps real scenery (not illustrated) when seen from a vehicle driver. Such a vehicle information projection system is typically called an HUD system.

The vehicle display device or the display mechanism of FIG. 1 includes, for example, a single display 101 and, for example, two reflectors 102-1 and 102-2. The display mechanism is typically called an HUD or an HUD device. The display mechanism is typically contained in a dashboard D, however, all or a part of the display mechanism may be disposed outside the dashboard D. In FIG. 1, the display 101 projects vehicle information on, for example, the windshield (screen), and the display 101 may be called a projector (projector-type display). A display range is set on a glass surface constructing the windshield, however, the display range may be made by a combiner (not illustrated) disposed, for example, on the dashboard D near the windshield or, for example, on a ceiling inside the vehicle.

Display information projected or displayed by the display mechanism or a display part typically is information related to a host vehicle (vehicle information). For example, the information includes measuring instrument information related to a measuring instrument of the host vehicle (e.g., a speed and a residual quantity of fuel of the host vehicle). Also, the vehicle information projected or displayed by the display mechanism or the display part may include, for example, at least one or any combination of preceding vehicle information, road surface information, succeeding vehicle information, route information, and the like, in addition to or instead of the measuring instrument information.

The preceding vehicle information is related to a preceding vehicle existing before or preceding the host vehicle. Typically, the preceding vehicle information is capable of indicating that a preceding vehicle exists before the host vehicle. Information about a road surface on which the host vehicle is travelling is, for example, traffic lane information. The traffic lane information is related to traffic lanes existing around or forward of the host vehicle. Typically, the traffic lane information is capable of indicating that at least one boundary (e.g., a dotted white line, a solid white line) between a traffic lane along which the host vehicle is travelling and at least one traffic lane adjacent to the said traffic lane on at least one side or both sides exists forward of the host vehicle. When the preceding vehicle information indicates a degree of attention to the preceding vehicle and is displayed in the display range, such preceding vehicle information may be called attention information.

In addition, the succeeding vehicle information is related to a succeeding vehicle existing behind the host vehicle. The route information is related to the route along which the host vehicle travels (e.g., car navigation information, regulation speed information) and the like.

The vehicle information projection system of FIG. 1 further includes, for example, a display controller, and the display controller at least includes a processor 104. The display controller is typically contained in the dashboard D, however, all or a part of the display controller may be disposed outside the dashboard D. A combination of the display mechanism and the display controller may be called an HUD or an HUD device. The processor 104 of FIG. 1 includes, for example, an estimator, a determiner, a controller, and a generator. The processor 104 or the estimator is capable of estimating that the vehicle is to be started by a vehicle occupant.

The processor 104 or the determiner is capable of determining whether driving of the vehicle has been started actually.

The processor 104 or the controller is capable of controlling a rotational angle (a setting angle or an adjustment angle) of the rotation-driver 103 (specifically, a stepping motor) that is capable of rotating the reflector 102-2 that is a retainer of the concave mirror about the predetermined shaft 106 (rotary shaft).

The display 101 of FIG. 1 is capable of generating the display light L of an image representing vehicle information, and a combination of the reflector 102-1 and the reflector 102-2 is capable of leading the display light L (projection light) outside the dashboard D.

In FIG. 1, the display 101 includes, for example, a liquid crystal panel and a light emitting part, and is controlled by the display controller or the processor 104 of FIG. 1. With this configuration, the display 101 formed by a single display, for example, is capable of generating or emitting the display light L based on the vehicle information. The reflectors 102-1 and 102-2 formed by two reflectors, for example, are capable of leading an optical path of the display light L from the display 101 to, for example, the windshield, and the vehicle driver is able to recognize the display light L (vehicle information) as a virtual image on the windshield.

Desirably, the vehicle information projection system of FIG. 1 further includes, for example, a detector 105 capable of detecting a high temperature state of the display 101. The detector 105 is a temperature sensor formed by, for example, a thermistor which is inexpensive. When, for example, the display 101 is in a high temperature state of 85 degrees centigrade or higher due to, for example, sunlight (external light), the processor is capable of determining that the display 101 is in a high temperature state higher than a predetermined temperature. Alternatively, the detector 105 is, for example, an illumination level sensor capable of more precisely measuring a high temperature state. For example, when detecting a quantity of light greater than a predetermined quantity, the processor is capable of determining that the display 101 seems to become higher in temperature to be, for example, equal to or higher than 85 degrees centigrade. The detector 105 may be, for example, a combination of a temperature sensor and an illumination level sensor. The processor may determine that the display 101 is in a high temperature state higher than a predetermined temperature or determine whether the display 101 seems to become a high temperature state, using a rising rate (rate of change) of the temperature of the display 101 and/or a rising rate (rate of change) of the illumination level of the external light in the display 101.

The display controller or the processor 104 of FIG. 1 further includes, for example, storage. The storage is capable of storing, for example, various types of data needed for processes or operations by the processor 104, such as the estimator, the determiner, the controller, and the generator. The display controller or the processor 104 is formed typically by, for example, a microcomputer, and may include, for example, a CPU, memory, such as ROM and RAM, and an I/O interface, and the like. The processor 104 is typically formed by a CPU and RAM (work area), and the storage is typically formed by ROM (e.g., EEPROM). For example, the ROM may store a program that causes the CPU to execute a predetermined operation (a vehicle information projection process), and the RAM may form a work area of the CPU. The ROM may store, for example, data needed to determine or operate the vehicle information. The display controller of FIG. 1 is connected to an information acquisition unit (not illustrated) capable of, for example, acquiring various types of information via a LAN (not illustrated) set or mounted on the vehicle. The display controller may typically be called an ECU (Electronic Control Unit).

In FIG. 1, the display controller is connected to an image processor (not illustrated) via, for example, a LAN (e.g., a bus-type LAN). The image processor is capable of taking captured images from, for example, an image capturing unit (not illustrated) having image pickup devices, such as CCD, and detecting or extracting real time, for example, a traffic lane or a road based on the captured images. In addition, the image processor may detect or extract boundaries between a plurality of traffic lanes (e.g., a dotted white line, a solid white line, a yellow (orange) solid line) and may detect or extract a preceding vehicle existing before the vehicle (e.g., a precedent vehicle, an oncoming vehicle) and/or an obstacle. The image capturing unit is, for example, a camera (a front camera), and is installed, for example, near an inner rearview mirror (a rear-view mirror) which is not illustrated.

Of course, the image processor may be omitted. That is, the display controller may be connected to the image capturing unit directly via, for example, the LAN, and the display controller or the processor 104 may detect or extract an object such as, for example, a boundary, based on the captured images (real scenery) by itself.

FIG. 2 illustrates an example of an operation of a rotational angle (setting angle) of the rotation-driver 103 when driving of a vehicle is started actually (an explanatory view). When a vehicle occupant is not in the vehicle, that is, the display 101 of FIG. 1 does not necessarily have to output the display light L, the processor 104 or the controller is capable of keeping an initial angle of the rotation-driver 103 corresponding to an initial position of the reflector 102-2 (a setting angle at which a tilt angle made by a bottom surface of the reflector 102-2 that is a retaining part of the concave mirror and a virtual horizontal line is, for example, 0 degree). When the vehicle occupant turns on an ignition key or a start button, the vehicle or a driving part (specifically, an engine, a traction motor, a hybrid engine, and the like) of the vehicle is started. The processor 104 or the controller is capable of keeping a final angle of the rotation-driver 103 corresponding to the normal operation position (final position) of the reflector 102-2 (a setting angle at which a tilt angle is, for example, 135 degrees (90+45) degrees or −45 degrees.

When the rotational angle (setting angle) of the rotation-driver 103 is set to the final angle (normal operation position), the reflector 102-2 is fixed as illustrated in FIG. 1, and the vehicle occupant is able to recognize the virtual image (vehicle information) corresponding to the display light L. That is, the inventors have recognized that it is desirable that after turning on of the ignition key or the start button, completion of preparation of display of the vehicle information is performed promptly.

FIG. 3 is a flowchart illustrating an example of control of a rotational angle (setting angle) of the rotation-driver 103 when driving of a vehicle is started actually. The processor 104 or the estimator of FIG. 1 determines, for example, whether the vehicle occupant has unlocked a vehicle door and, when inputting a signal indicating that the door has been unlocked, estimates that the vehicle is to be started by the vehicle occupant (step ST11). A standby state of the processor 104 (typically, a microcomputer) of FIG. 1 is released, and movement or adjustment of the initial angle of the rotation-driver 103 corresponding to the initial position (typically, the position of an origin) of the reflector 102-2 is started (step ST12).

The processor 104 or the controller of FIG. 1 is capable of controlling the rotation-driver 103 so that the rotational angle (setting angle) of the rotation-driver 103 is moved from the initial angle (tilt angle is, for example, 0 degree) corresponding to the position of an origin of the reflector 102-2 to the first intermediate angle (tilt angle is, for example, 90 degrees) between the initial angle and the final angle corresponding to the normal operation position of the reflector 102-3 (tilt angle is, for example, 90+45 degrees). The controller is capable of stopping the driving of the rotation-driver 103 so that the rotational angle (setting angle) of the rotation-driver 103 is kept or stopped at the first intermediate angle (a first stop position) (step ST13).

FIG. 4 illustrates an example of an operation at the first stop position in flowchart of FIG. 3 (an explanatory view). The processor 104 or the determiner of FIG. 1 is then capable of determining whether, for example, the ignition key has been turned on (see step ST14 of FIG. 3). After driving of the vehicle is started actually, the controller is capable of controlling the rotation-driver 103 so that the rotational angle (setting angle) of the rotation-driver 103 is moved from the first intermediate angle (the first stop position) to the final angle (step ST15).

The processor 104 of FIG. 1 determines whether driving of the vehicle has started actually and estimates that the vehicle is to be started by the vehicle occupant. Therefore, before driving of the vehicle is started actually, when the start of the driving of the vehicle is estimated, the rotational angle of the rotation-driver 103 is capable of standing by at the first intermediate angle (the first stop position). When driving of the vehicle is started actually, the rotational angle (setting angle) of the rotation-driver 103 is moved not from the initial angle but from the first intermediate angle. Therefore, the time before the rotational angle of the rotation-driver 103 arrives at the final angle is reduced. That is, preparation of display of the vehicle information is completed quickly.

FIG. 5 is a flowchart illustrating an example of control of the rotational angle (setting angle) of the rotation-driver 103 when driving of the vehicle is stopped. After preparation for display of the vehicle information is completed, the processor 104 or the determiner of FIG. 1 is capable of determining whether, for example, the ignition key has been turned off (step ST21). After driving of the vehicle is stopped, the determiner determines, for example, whether the vehicle occupant has locked the door of the vehicle, and, when signals indicating that the door has been locked are input, determines that vehicle is not started by the vehicle occupant (step ST22). Also, before the signals indicating that the door has been locked are input, the determiner is capable of determining that 60 seconds, for example, have elapsed after the ignition key is turned off (step ST22).

The controller is capable of controlling the rotation-driver 103 so that, when driving of the vehicle is stopped, the rotational angle (setting angle) of the rotation-driver 103 is kept at the final angle for a predetermined period. The rotational angle of the rotation-driver 103 is returned from the final angle of the rotation-driver 103 corresponding to the normal operation position (final position) of the reflector 102-2 to the initial angle of the rotation-driver 103 corresponding to the initial position of the reflector 102-2 (step ST23).

FIG. 6 illustrates an example of an operation in an initial position in the flowchart of FIG. 5 (explanatory view). When the ignition key is turned off, setting of the reflector 102-2 is changed from the normal operation position to the initial position. Then, after the vehicle occupant turns the ignition key on again, setting of the reflector 102-2 is changed from the initial position to the normal operation initial position (see FIG. 6).

In FIG. 5, when driving of the vehicle is stopped, the rotational angle (setting angle) of the rotation-driver 103 is kept at the final angle for a predetermined period (step ST22). That is, display of the vehicle information is restored or recovered immediately when driving of the vehicle is resumed in a predetermined period (during execution or during processing of step ST22).

FIG. 7 is a flowchart illustrating another example of control of a rotational angle (setting angle) of a rotation-driver 103 when driving of a vehicle is stopped. Step ST34 is executed when the rotational angle of the rotation-driver 103 is returned from the final angle of the rotation-driver 103 corresponding to the normal operation position (final position) of the reflector 102-2 to the initial angle of the rotation-driver 103 corresponding to the initial position of the reflector 102-2. The controller is capable of controlling the rotation-driver 103 so that the processor 104 or the determiner of FIG. 1 determines whether driving of the vehicle has been resumed during the return of the rotational angle to the initial angle (step ST34) and, when driving of the vehicle is resumed, the rotational angle returns to the final angle.

FIG. 8 illustrates an example of an operation in an initial position in the flowchart of FIG. 7 (explanatory view). When it is determined whether driving of the vehicle has been resumed, and it is determined that driving of the vehicle has not been resumed, the rotational angle of the rotation-driver 103 advances to the initial angle. Therefore, if the ignition key is not turned on before setting of the reflector 102-2 is changed from the normal operation position to the initial position, the rotational angle of the rotation-driver 103 advances to the initial angle. That is, during the change of setting of the reflector 102-2 from the normal operation position to the initial position, it is determined at, for example, a check point 1 whether driving of the vehicle has been resumed (see step ST34 of FIG. 7). In addition to or instead of the check point 1, it may be determined whether driving of the vehicle has been resumed in, for example, check point 2. In check point 2, for example, when driving of the vehicle is resumed, setting of the reflector 102-2 returns to the normal operation position from the check point 2.

After driving of the vehicle is stopped, during the return of the rotational angle of the rotation-driver 103 to the initial angle, it is determined whether driving of the vehicle has been resumed. When driving of the vehicle is resumed, the rotational angle of the rotation-driver 103 is capable of being returned to the final angle immediately.

FIG. 9 is a flowchart illustrating an example of control when the display 101 is in a high temperature state. Step ST44 is executed when the rotational angle of the rotation-driver 103 is in the first intermediate position of the rotation-driver 103 corresponding to the first stop position (first intermediate position) of the reflector 102-2. When the processor 104 or the determiner of FIG. 1 detects, for example, a quantity of light greater than a predetermined quantity, the rotational angle of the rotation-driver 103 is set in a second intermediate position of the rotation-driver 103 corresponding to a second stop position (second intermediate position) of the reflector 102-2 (step ST45).

FIG. 10 illustrates an example of an operation in the second stop position in the flowchart of FIG. 9 (explanatory view). The controller is capable of controlling the rotation-driver 103 so that, when the display 101 is in a high temperature state or seems to become a high temperature state, the rotational angle of the rotation-driver 103 is moved from the first intermediate angle to a second intermediate angle between one of the initial angle or the final angle (e.g., the initial angle) and the first intermediate angle. When the rotational angle of the rotation-driver 103 is stopped at the first intermediate angle, that is, when preparation for the display of the vehicle information is started, whether or not the display 101 is in a high temperature state will be considered. When the display 101 is in a high temperature state or seems to become a high temperature state, the rotational angle of the rotation-driver 103 is moved to another intermediate angle (the second intermediate angle, or a further third intermediate angle if necessary). The rotational angle of the rotation-driver 103 is moved from the first intermediate angle, that is, the rotational angle of the rotation-driver 103 is not stopped at the first intermediate angle. Therefore, it is avoided or prevented that the display 101 becomes a high temperature state.

FIG. 11 is a flowchart illustrating an example of control when the power supply is temporarily shut down. Temporary shutdown of the power supply to a display part 11 is recorded (steps ST51, 52).

Then, the determiner may determine whether occurrence of temporary shutdown of the power supply has been recorded. The controller may control the rotation-driver so that, when occurrence of temporary shutdown of the power supply is recorded, a current rotational angle of the rotation-driver 103 is kept or a current rotational angle is moved to the final angle.

When the processor 104 starts upon restoration or recovery of the power supply, the determiner is capable of discovering a record representing occurrence of temporary shutdown of the power supply. When temporary shutdown of the power supply occurs, it is estimated that the rotational angle of the rotation-driver 103 has been the final angle or that the rotational angle of the rotation-driver 103 is located near the final angle. Therefore, the controller is capable of keeping the rotational angle of the rotation-driver 103 at the final angle or returning to the final angle immediately. When the power supply is restored or recovered, display of the vehicle information is restored or recovered immediately.

As an example, when the display range is a wide field angle or when display of the virtual image is unnecessary, a vehicle occupant may carry out temporary stop (emergency stop) of the display 101. Therefore, when the power supply to the display 101 is shut down temporarily, the rotational angle of the rotation-driver 103 is the final angle. It is highly possible that display of the display 101 is resumed by a vehicle occupant. Therefore, the rotational angle of the rotation-driver 103 is capable of being kept at the same final angle without returning to the initial angle.

As another example, when the ignition key is turned on, a voltage of a battery of the vehicle (in-vehicle battery) is lowered temporarily and, therefore, temporary shutdown (emergency stop) of the power supply may occur. Generally, however, the voltage of the in-vehicle battery is restored instantly. Therefore, the rotational angle of the rotation-driver 103 is able to advance to the final angle directly (e.g., from the first intermediate angle) without returning to the initial angle.

The present invention is not limited to the exemplary embodiments described above, and those skilled in the art may easily change the exemplary embodiments described above without departing from the scope of the claims.

INDUSTRIAL APPLICABILITY

The present invention is applicable, for example, to a head-up display device mounted to a vehicle.

DESCRIPTION OF REFERENCE NUMERALS

101: Display
102: Reflector
103: Rotation-driver
104: Processor
105: Detector
106: Predetermined shaft (rotary shaft)
L: Display light

The invention claimed is:

1. A vehicle display device, comprising:
a display part provided with a display that generates display light of an image representing vehicle information and a reflector that reflects the display light, and capable of displaying the display light as a virtual image;
a rotation-driver capable of driving the reflector to rotate about a predetermined shaft;
an estimator that estimates that a vehicle is to be started by a vehicle occupant;
a determiner that determines whether driving of the vehicle has been started actually; and
a controller that controls a rotational angle of the rotation-driver, wherein
the controller controls the rotation-driver so that, when driving of the vehicle is to be started, the rotational angle is moved from an initial angle corresponding to an initial position of the reflector to a first intermediate angle between the initial angle and a final angle corresponding to a normal operation position of the reflector, and
the controller controls the rotation-driver so that, after driving of the vehicle is started actually, the rotational angle is moved from the first intermediate angle to the final angle.

2. The vehicle display device according to claim 1, wherein
when the rotational angle is stopped at the first intermediate angle, the determiner determines that the display is in a high temperature state higher than a predetermined temperature or determines whether the display seems to become a high temperature state, and
when the display is in a high temperature state or seems to become a high temperature state, the controller controls the rotation-driver so that the rotational angle is moved from the first intermediate angle to a second intermediate angle between the initial angle and the first intermediate angle or between the final angle and the first intermediate angle.

3. The vehicle display device according to claim 1, wherein
the determiner determines whether power supply to the display has been shut down temporarily, and
when the power supply is shut down temporarily, the controller records occurrence of the temporary shutdown of the power supply.

4. The vehicle display device according to claim 3, wherein
when a processor including the determiner and the controller starts, the determiner determines whether occurrence of temporary shutdown of the power supply has been recorded, and
the controller controls the rotation-driver so that, when occurrence of temporary shutdown of the power supply is recorded, a current rotational angle of the rotation-driver is kept or the current rotational angle is moved to the final angle.

5. The vehicle display device according to lam t claim 1, wherein
the determiner determines whether driving of the vehicle has been stopped, and
the controller controls the rotation-driver so that, when driving of the vehicle is stopped, the rotational angle is kept at the final angle for a predetermined period.

6. The vehicle display device according to claim 1, wherein
the controller controls the rotational angle so that after driving of the vehicle is stopped, the rotational angle is moved from the final angle to the initial angle,
the determiner determines that whether driving of the vehicle has been resumed during return of the rotational angle to the initial angle, and
the controller controls the rotation-driver so that, when driving of the vehicle is resumed, the rotational angle returns to the final angle.

* * * * *